(12) United States Patent
Kumar et al.

(10) Patent No.: US 11,487,292 B2
(45) Date of Patent: Nov. 1, 2022

(54) METHOD AND SYSTEM FOR GENERATING TRAJECTORY PLAN FOR AUTONOMOUS GROUND VEHICLES

(71) Applicant: Wipro Limited, Bangalore (IN)

(72) Inventors: Balaji Sunil Kumar, Bengaluru (IN); Manas Sarkar, Kolkata (IN)

(73) Assignee: Wipro Limited, Bangalore (IN)

( * ) Notice: Subject to any disclaimer, the term of this patent is extended or adjusted under 35 U.S.C. 154(b) by 301 days.

(21) Appl. No.: 16/930,642

(22) Filed: Jul. 16, 2020

(65) Prior Publication Data
US 2021/0311479 A1    Oct. 7, 2021

(30) Foreign Application Priority Data
Apr. 1, 2020   (IN) .............................. 202041014505

(51) Int. Cl.
*G05D 1/02*    (2020.01)
*B60W 60/00*    (2020.01)

(52) U.S. Cl.
CPC .......... *G05D 1/0212* (2013.01); *B60W 60/001* (2020.02); *B60W 2530/201* (2020.02); *G05D 2201/0213* (2013.01)

(58) Field of Classification Search
CPC ........ G05D 1/0212; G05D 2201/0213; B60W 60/001; B60W 2530/201
See application file for complete search history.

(56) References Cited

U.S. PATENT DOCUMENTS

| 2019/0072965 A1 | 3/2019 | Zhang et al. |
| 2019/0212749 A1 | 7/2019 | Chen et al. |
| 2019/0286147 A1* | 9/2019 | Matsunaga ....... B60W 60/0015 |

* cited by examiner

*Primary Examiner* — Rodney A Butler
(74) *Attorney, Agent, or Firm* — Finnegan, Henderson, Farabow, Garrett & Dunner, LLP

(57) ABSTRACT

The disclosure relates to method and system for generating trajectory plan for autonomous ground vehicles (AGV). The method includes assessing an upcoming goal position for an AGV with respect to a current position of the AGV to establish a need for preparing a trajectory plan for a critical segment of the path. The method further includes determining, upon establishing the need, a next free road region based on a hint next rest pose along the critical segment, generating a trajectory sub-plan corresponding to the next free road region by iteratively determining a set of intermediate poses between the current rest pose and the hint next rest pose, and generating the trajectory plan for the critical segment of the path by iteratively generating the trajectory sub-plans between the current rest pose and the final goal pose.

20 Claims, 12 Drawing Sheets

METHOD AND SYSTEM FOR GENERATING TRAJECTORY PLAN FOR AUTONOMOUS GROUND VEHICLES

TECHNICAL FIELD

This disclosure relates generally to autonomous ground vehicles, and more particularly to method and system for generating a trajectory plan for an autonomous ground vehicle (AGV).

BACKGROUND

Autonomous ground vehicles (AGVs) are increasingly deployed in a variety of indoor and outdoor settings so as to facilitate efficient transportation. AGVs are driverless vehicles that are capable of navigating from a point of origin to destination, with little or no human intervention. In order to enable autonomous navigation, the AGV may be equipped with multiple sensors and control arrangements. The sensors, for example, may be position sensors, orientation sensors and vision sensors. These sensors are configured to constantly sense surrounding environment of autonomous vehicles in order to identify a long-distance global path and a local trajectory path for enabling secure navigation.

However, sometimes AGV may face some difficult navigating scenarios. These navigating scenarios may require navigating critical trajectory paths, which may require critical trajectory planning. Example of such navigating scenario may include sharp bends, twisting, and reversing. Existing trajectory planning techniques are limited in their scope and utility to navigate AGV in such critical trajectory paths. For example, existing trajectory planning techniques are limited while navigating sharp bends when another vehicle is coming from opposite side or when another vehicle is standing due to break down. Similarly, existing trajectory planning techniques are limited while navigating a factory or a port area where loading and unloading of goods may result in unorganized space for navigation. Additionally, existing trajectory planning techniques are limited during difficult parking scenario with limited space to maneuver the AGV.

SUMMARY

In an embodiment, a method for generating a trajectory plan for an autonomous ground vehicle is disclosed. In one example, the method may include assessing an upcoming goal position for an AGV with respect to a current position of the AGV along a path of the AGV to establish a need for preparing a trajectory plan for a critical segment of the path. The method may further include determining, upon establishing the need, a next free road region based on a hint next rest pose along the critical segment of the path. The set of hint next rest poses may be determined, by an artificial intelligence (AI) model, based on a current road region, a current rest pose, a final goal pose, a visible road region, and a vehicle capability. The method may further include generating a trajectory sub-plan corresponding to the next free road region by iteratively determining a set of intermediate poses between the current rest pose and the hint next rest pose based on the hint next rest pose for the next free road region and a set of parameters of the AGV. The method may further include generating the trajectory plan for the critical segment of the path by iteratively generating the trajectory sub-plans for a set of probable rest poses between the current rest pose and the final goal pose. A probable rest pose for the next free road region may be a last intermediate rest pose of the next free road region. Further, the iteration may be performed until the AGV reaches the final goal pose.

In another embodiment, a system for generating a trajectory plan for an autonomous ground vehicle is disclosed. In one example, the system may include a navigation device, which may include processor and a memory communicatively coupled to the processor. The memory stores processor instructions, which, on execution, causes the processor to assess an upcoming goal position for an AGV with respect to a current position of the AGV along a path of the AGV to establish a need for preparing a trajectory plan for a critical segment of the path. The processor-executable instructions, on execution, may further cause the processor to determine, upon establishing the need, a next free road region based on a hint next rest pose along the critical segment of the path. The set of hint next rest poses may be determined, by an AI model, based on a current road region, a current rest pose, a final goal pose, a visible road region, and a vehicle capability. The processor instructions may further cause the processor to generate a trajectory sub-plan corresponding to the next free road region by iteratively determining a set of intermediate poses between the current rest pose and the hint next rest pose based on the hint next rest pose for the next free road region and a set of parameters of the AGV. The processor instructions may further cause the processor to generate the trajectory plan for the critical segment of the path by iteratively generating the trajectory sub-plans for a set of probable rest poses between the current rest pose and the final goal pose. A probable rest pose for the next free road region may be a last intermediate rest pose of the next free road region. Further, the iteration may be performed until the AGV reaches the final goal pose.

In yet another embodiment, a non-transitory computer-readable storage medium, storing computer-executable instructions for generating a trajectory plan for an autonomous ground vehicle is disclosed. The stored instructions, when executed by a processor, may cause the processor to perform operations including assessing an upcoming goal position for an AGV with respect to a current position of the AGV along a path of the AGV to establish a need for preparing a trajectory plan for a critical segment of the path. The operations further include determining, upon establishing the need, a next free road region based on a hint next rest pose along the critical segment of the path. The set of hint next rest poses may be determined, by an AI model, based on a current road region, a current rest pose, a final goal pose, a visible road region, and a vehicle capability. The operations further include generating a trajectory sub-plan corresponding to the next free road region by iteratively determining a set of intermediate poses between the current rest pose and the hint next rest pose based on the hint next rest pose for the next free road region and a set of parameters of the AGV. The operations further include generating the trajectory plan for the critical segment of the path by iteratively generating the trajectory sub-plans for a set of probable rest poses between the current rest pose and the final goal pose. A probable rest pose for the next free road region may be a last intermediate rest pose of the next free road region. Further, the iteration may be performed until the AGV reaches the final goal pose.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
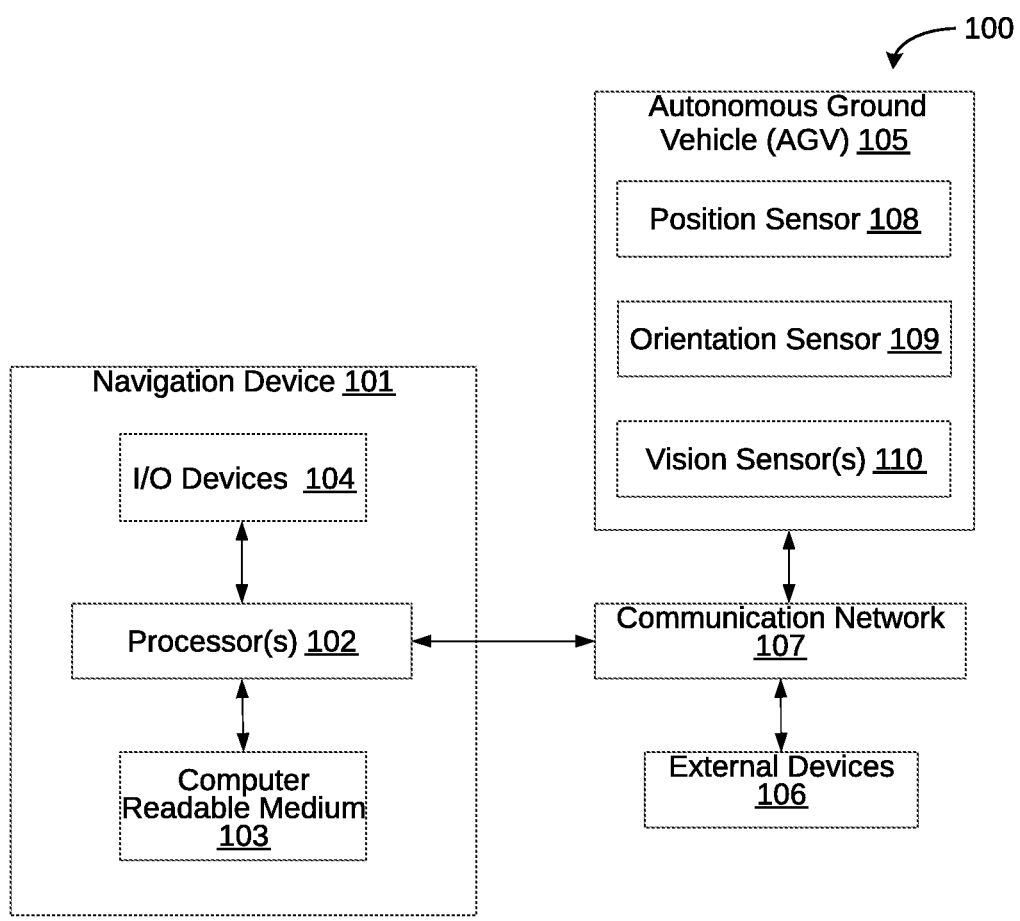
FIG. 1 is a block diagram of an exemplary system for generating a trajectory plan for an autonomous ground vehicle (AGV), in accordance with some embodiments of the present disclosure.

Referring now to FIG. 1, an exemplary system 100 for generating a trajectory plan for an autonomous ground vehicle (AGV) 105 is illustrated, in accordance with some embodiments of the present disclosure. In particular, the system 100 may include a navigation device 101 so as to generate a trajectory plan for a critical segment of a path for navigating the AGV 105. As will be appreciated, the navigation device 101 may be any computing device including, but not limited to, a server, a desktop, a laptop, a notebook, a netbook, a tablet, a smartphone, a mobile phone, or the like.

Further, as will be appreciated by those skilled in the art, the AGV 105 may be any vehicle capable of sensing dynamic changing environment or difficult navigating scenarios, and of navigating without any human intervention. Thus, the AGV 105 may include at least a number of sensors, a vehicle drive train, and a processor-based control system, among other components. The sensors may enable sensing the changing environment and difficult navigating scenarios by capturing various sensor parameters. The sensors may include a position sensor 108 for acquiring instant position (i.e., current location) of the AGV 105 with respect to a navigation map (i.e., within a global reference frame), the orientation sensor 109 for acquiring instant orientation (i.e., current pose or direction) of the AGV 105 with respect to the navigation map, and one or more vision sensors 110 for acquiring instant three-dimensional (3D) image of an environment around the AGV 105. In some embodiments, the 3D image may be a 360-degree field of view (FOV) of the environment (i.e., environmental FOV) that may provide information on presence of any objects (e.g., a moving pedestrian) in the vicinity of the AGV 105. Further, in some embodiments, the 3D image may be a frontal FOV of a navigation path (i.e., navigational FOV) of the AGV 105. By way of example, the position sensor 108 may be a global positioning system (GPS) sensor, the orientation sensor 109 may be an inertial measurement unit (IMU) sensor, and the vision sensors 110 may be any of a light detection and ranging (LiDAR) scanner, a laser scanner, a radio detection and ranging (RADAR) scanner, a short-range RADAR scanner, a camera, or ultrasonic scanner.

As will be described in greater detail in conjunction with FIGS. 2-10, the navigation device 101 may assess an upcoming goal position for an AGV 105 with respect to a current position of the AGV 105 along a path of the AGV 105 to establish whether a need exists to prepare a trajectory plan for a critical segment of the path. Upon establishing the need, the navigation device 101 may determine a next free road region based on a hint next rest pose along the critical segment of the path. The set of hint next rest poses may be determined, by an artificial intelligence (AI) model, based on a current road region, a current rest pose, a final goal pose, a visible road region, and a vehicle capability. Once the next free road regions is determined, the navigation device 101 may generate a trajectory sub-plan corresponding to the next free road region by iteratively determining a set of intermediate poses between the current rest pose and the hint next rest pose based on the hint next rest pose for the next free road region and a set of parameters of the AGV. The navigation device 101 may further generate the trajectory plan for the critical segment of the path by iteratively generating the trajectory sub-plans for a set of probable rest poses between the current rest pose and the final goal pose. A probable rest pose for the next free road region may be a last intermediate rest pose of the next free road region. Further, the iteration may be performed until the AGV reaches the final goal pose. As will be appreciated, the probable rest pose for the next free road region (also referred to as actual rest pose for the next free road region) corresponds to the hint next rest pose for the next free road region. Thus, the probable rest pose for the next free road region will become the current rest pose for the current region when the vehicle actually reaches the probable rest pose through a series of intermediate path between the current rest pose and the hint next rest pose. The probable rest pose is called as such because the vehicle while trying to reach the hint next rest pose of the next free road region may not actually reach the hint next rest pose but somewhere nearby.

The navigation device 101 may include one or more processors 102, a computer-readable medium (for example, a memory) 103, and an input/output (I/O) device 104. The computer-readable medium 103 may store instructions that, when executed by the one or more processors 102, cause the one or more processors 102 to generate trajectory plan for the AGV, in accordance with aspects of the present disclosure. The trajectory plan may be for the critical segment of the path to be navigated by the AGV 105. The computer-readable medium 103 may also store various data (for example, base path, hint next rest poses, next free road regions, current road region, current rest pose, final goal pose, visible road region, vehicle capability data, AI model, probable rest poses, trajectory sub-plans, trajectory plan, training data acquired from navigation along multiple critical paths, and so forth) that may be captured, processed, and/or required by the navigation device 101. The navigation device 101 may interact with a user via a user interface accessible via the I/O devices 104.

The navigation device 101 may also interact with one or more external devices 106 or with the AGV 105 over a communication network 107 for sending or receiving various data. The external devices 106 may include, but may not be limited to, a remote server, a digital device, or another computing system. In some embodiments, the navigation device 101 may be part of the AGV 105.

Figure 2:
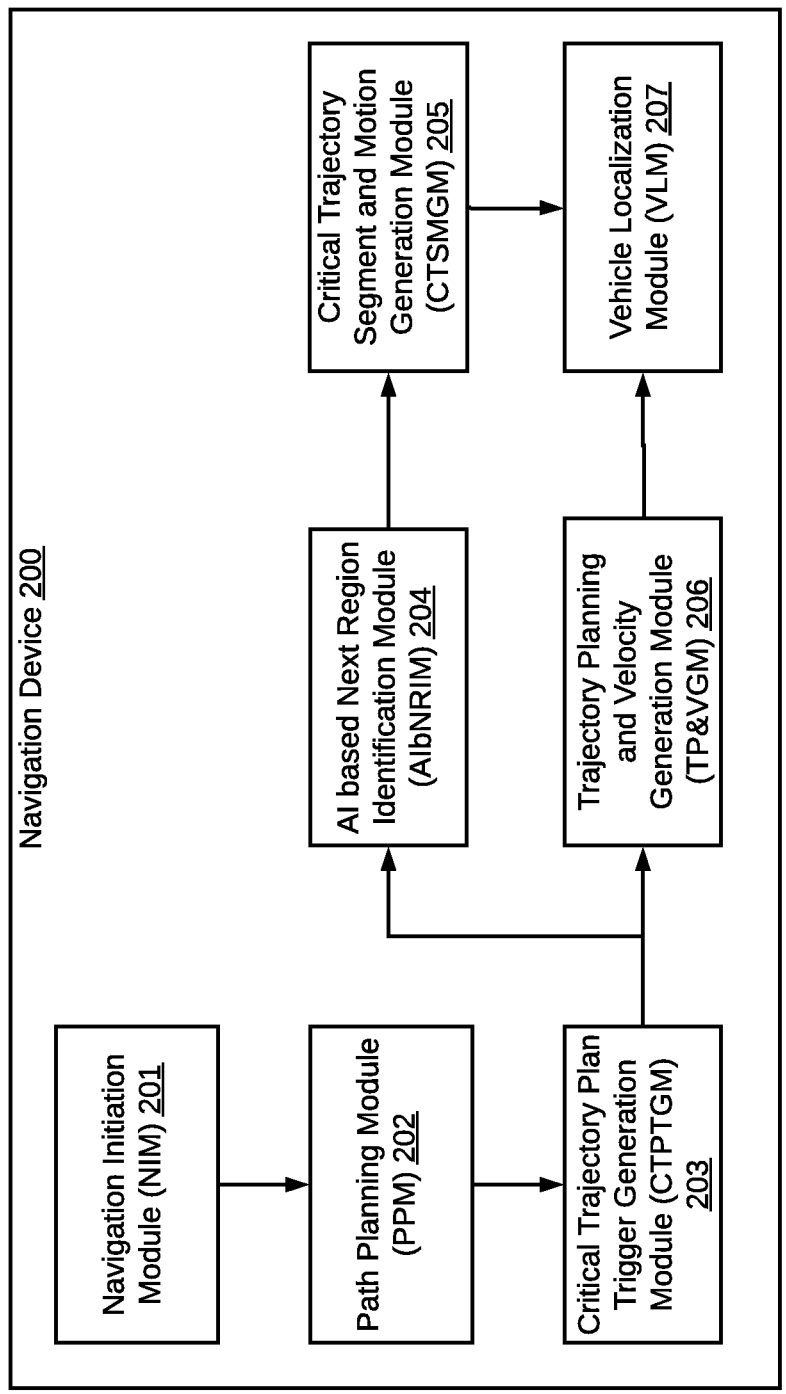
FIG. 2 is a functional block diagram of an exemplary navigation device for generating a trajectory plan for an AGV, in accordance with some embodiments of the present disclosure.

Referring now to FIG. 2, a functional block diagram of an exemplary navigation device 200 (analogous to the navigation device 101 implemented by the system 100 of FIG. 1) for generating a trajectory plan for an AGV 105 is illustrated, in accordance with some embodiments of the present disclosure. The navigation device 200 may include various modules that perform various functions so as to generate the trajectory plan for the critical segment of the path followed by the AGV 105. In some embodiments, navigation device 200 may include a navigation initiation module (NIM) 201, a path planning module (PPM) 202, a critical trajectory plan trigger generation module (CTPTGM) 203, an AI based next region identification module (AIbNRIM) 204, a critical trajectory segment and motion generation module (CTSMGM) 205, a trajectory planning and velocity generation module (TP&VGM) 206, a vehicle localization module (VLM) 207. It should be noted that, in some embodiments, the aforementioned modules 201-207 may be a part of the navigation device 200. As will be appreciated, the navigation device 200 may also include various other modules than those mentioned above so as to control and navigate the AGV 105. Further, as will be appreciated by those skilled in the art, all such aforementioned modules 201-207 may be represented as a single module or a combination of different modules. Moreover, as will be appreciated by those skilled in the art, each of the modules 201-207 may reside, in whole or in parts, on one device or multiple devices in communication with each other.

The NIM 201 may be configured to initiate a navigation process from path planning to velocity generation to autonomously drive the AGV 105 from source to the destination. In an embodiment, the NIM 201 may act as a pure user interface (UI). The UI may display a navigation map to a user of the AGV 105. The navigation map displayed may enable the user to see a current initial location (also referred as a source point) of the AGV 105. In addition, a provision may be provided to the user to touch any point (on drivable road area only) on the navigation map displayed via the UI in order to select a destination location (also referred as a destination point). This may initiate the navigation process for the AGV 105 from its current location to the destination location.

The path planning module 202 may produce a base path (also referred to as a global path) that is to be used for navigation of the AGV 105 from the current initial location to the destination location. In order to produce the base path, the path planning module 202 may use a shortest path planning algorithm or any other path planning algorithms. Examples of the path planning algorithm may include, but is not limited to, a Dijkstra algorithm or A* algorithm. The base path may be produced on a 2D occupancy grid map and a source to destination path plan may be generated. For motion of the AGV 105, the path planning module 202 may generate a part or a segment of the base path (also referred to as a local path or a trajectory path) that is 10 to 15 meters distance from the current initial position of the AGV 105. The path planning module 202 may provide the local path to the CTPTGM 203 for assessment and subsequent generation of trajectory plan based on the assessment.

The CTPTGM 203 may be configured to assess the upcoming goal position with respect to the current position of the AGV 105 along the local path. The upcoming goal position may be assessed to understand a level of difficulty that the AGV 105 may face in order to reach the upcoming goal position. The level of difficulty may be evaluated by determining an amplitude of trigger parameter. Once the amplitude of the trigger parameter is beyond a predefined threshold, a trigger may be generated to generate the trajectory plan for the critical segment of the path. However, if the amplitude of the trigger parameter is within the predefined threshold, no trigger may be generated, and the trajectory plan may be generated as per normal circumstance.

The AIbNRIM 204 may be configured to train the AI model in order to determine a hint next rest pose. The hint next rest poses may be employed to determine a corresponding free road region and the trajectory plan for movement of the AGV 105. It should be noted that, during training phase, the AGV 105 may be driven through various critical segments involving difficult navigation scenarios. Thus, the AI model may be trained by the AIbNRIM 204 in such a way that it may detect a change in maneuvering of the AGV 105. The change in maneuvering may be detected for different steering angle and change in direction. Additionally, during the training phase, road regions and a set of hint next rest poses are defined and annotated in order to be applied to AI model input as well as output. Thereafter, the trained AI model may generate an output (i.e., hint next rest pose) based on the inputs provided (e.g., current road region, current rest pose, final goal pose, visible road region, vehicle capability, etc.). As will be appreciated, the output may help in determining the next free road region and the trajectory plan for the movement of the AGV 105.

The CTSMGM 205 may be configured to generate the trajectory plan by determining a set of trajectory sub-plans corresponding to the set of next free road regions between the current position and the upcoming goal position. In particular, the CTSMGM 205 may be configured to a trajectory sub-plan for a next free region based on a hint next rest pose for that region and the current pose (for the current region). The CTSMGM 205 may be configured to generate a trajectory sub-plan for a next free region based on a hint next rest pose for that region and the current pose (for the current region). By following this trajectory sub-plan, the AGV 105 may reach a probable rest pose in the next free region. Further, the CTSMGM 205 may be configured to update the current pose with the probable rest pose of the next free region, and generate a new trajectory sub-plan for a succeeding next free region (i.e., a next free region preceding to the current next free region for which trajectory sub-plan is to be determined) based on a hint next rest pose for that region and the current pose (which is the probable rest pose after following the previously generated trajectory sub-plan). Thus, by iteratively generating, the trajectory sub-plans until the vehicle reaches the upcoming goal position, the AGV 105 may generate the trajectory plan for navigation. The probable rest pose may be derived based on variation applied on an initial condition of the AGV 105 over a period of time. In some embodiments, the variation may include, a steering angle, a torque, etc., while the initial condition may include a current pose of the AGV 105, a steering angle position on rest, etc. Additionally, variation may be applied for a certain time until a significant angular alignment may have been achieved towards an end point alignment and the AGV 105 is within the road region.

The TP&VGM 206 may generate a suitable trajectory plan as per normal circumstances in absence of the need to generate the critical trajectory plan (i.e., trajectory plan for the critical segment of the path). The TP&VGM 206 may also generate an actual velocity for the trajectory path. The TP&VGM 206 may, therefore, generate the trajectory plan and the actual velocity based on current environment data and speed of the AGV 105. In particular, the TP&VGM 206 may generate a realistic velocity based on previous moment velocity and a projected velocity as per the trajectory plan. The TP&VGM 206 may generate the realistic velocity based on a trajectory-velocity plan. The trajectory planning may happen based on a current velocity and a global plan segment ahead of the AGV 105. The global path segment may be determined by a curvature data calculation. In some embodiments, a better trajectory suggestion (i.e., good for the movement of the AGV 105) may be generated by the TP&VGM 206. In should be noted that, the velocity generation may happen in certain frequency of say 100 ms and may be applied to the AGV 105 wheelbase. In addition, a next moment velocity may be observed for further realistic velocity calculation.

As will be appreciated, with application of velocity, the AGV 105 may come into motion. Further, while the AGV 105 may be in motion, the VLM 207 may collect data from wheelbase feedback, navigation Map data and current Lidar observation point's data. Once these data are collected, the VLM 207 may continuously localize the AGV 105 position on the navigation map with respect to the environment. In addition, any further trajectory planning may happen from a new position of the AGV 105, considering 1st and 2nd stages of a trajectory plan strategies.

It should be noted that all such aforementioned modules 201-207 may be implemented in programmable hardware devices such as programmable gate arrays, programmable array logic, programmable logic devices, or the like. Alternatively, all such aforementioned modules 201-207 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

As will be appreciated by one skilled in the art, a variety of processes may be employed for generating the trajectory plan for the AGV 105. For example, the exemplary system 100 and the associated navigation device 101 may generate trajectory plan for the AGV 105 for critical segments of the navigation path by the processes discussed herein. In particular, as will be appreciated by those of ordinary skill in the art, control logic and/or automated routines for performing the techniques and steps described herein may be implemented by the system 100 and the associated navigation device 101, either by hardware, software, or combinations of hardware and software. For example, suitable code may be accessed and executed by the one or more processors on the system 100 or the associated navigation device 101 to perform some or all of the techniques described herein. Similarly, application specific integrated circuits (ASICs) configured to perform some or all of the processes described herein may be included in the one or more processors on the system 100 or on the associated navigation device 101.

Figure 3:
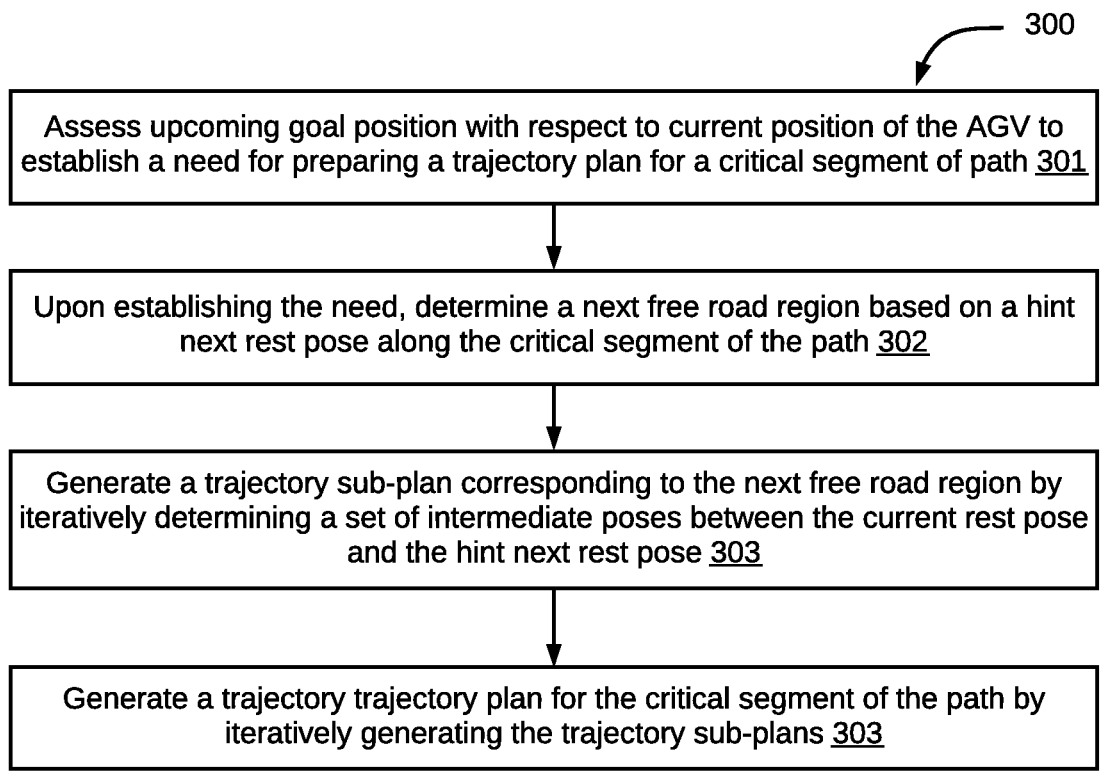
FIG. 3 is a flow diagram of an exemplary process for generating a trajectory plan for an AGV, in accordance with some embodiments of the present disclosure.

For example, referring now to FIG. 3, an exemplary process 300 for generating a trajectory plan for the AGV 105 via a system, such as the system 100 or the associated navigation device 101, is depicted via a flowchart, in accordance with some embodiments of the present disclosure. At step 301, an upcoming goal position for the AGV 105 along a path of the AGV 105 may be assessed with respect to the current position of the AGV 105 in order to establish a need for preparing the trajectory plan for the critical segment of the path. In some embodiments, the assessment may be performed by determining the trigger parameter, and comparing the trigger parameter with a predefined threshold. The trigger parameter may be determined based on a) a distance between the upcoming goal position and the current position, b) an angle between a final orientation of the AGV 105 at the upcoming goal position and a current orientation of the AGV 105, and c) an angle between an imaginary orientation of the AGV 105 towards the upcoming goal position at the current position and the current orientation of the AGV 105. Further, if the trigger parameter is greater than the predefined threshold, then the need is established and the trajectory plan may be prepared for the critical segment of the path. However, if the trigger parameter is not greater than the predefined threshold, then the need is not established and the trajectory plan need to be prepared as per normal circumstance. In other words, a standard trajectory plan may be prepared in an absence of the need.

Upon establishing the need for preparing the trajectory plan for the critical segment of the path, at step 302, a next free road region may be determined based on a hint next rest pose along the critical segment of the path. The hint next rest pose may be determined by an artificial intelligence (AI) model. Additionally, the hint next rest pose may be determined based on a current road region, a current rest pose, a final goal pose, a visible road region, and a vehicle capability. The vehicle capability may include, but is not limited to, a maximum steering angle, a forward turn with the maximum steering angle, a backward turn with the maximum steering angle, a vehicle height, a vehicle width, and a rate of change of steering angle at a given load. It should be noted that hint next rest pose may include a hint next position of the AGV 105 and a hint next orientation of the AGV 105. Further, it should be noted that the next free road region may be defined around the one or more of the set of hint next rest poses by employing region growing mechanism. The AI model may be trained to determine the hint next rest pose using training data acquired by the AGV 105 while driving through a plurality of critical segments. The training data may include the current road region, the current rest pose, the final goal pose, the visible road region, the vehicle capability, as input of the AI model and a set of hint next rest poses in a successive road region as output of the AI model.

At step 303, the trajectory sub-plan corresponding to the next free road region may be generated for the critical segment may be generated by iteratively determining a set of intermediate poses between the current rest pose and the hint next rest pose based on the hint next rest pose for the next free road region and a set of parameters of the AGV. The set of parameters may include, but is not limited to, vehicle load, initial steering angle, application cycle duration, and rate of change of the steering angle. In some embodiments, the trajectory sub-plan corresponding to the next free road region may be generated by a) computing an initial steering angle for the current rest pose based on the hint next rest pose for the next free road region, and b) iteratively computing the set of intermediate poses in the next free road region based on the initial steering angle, a rate of change of the steering angle, and the hint next rest pose for the next free road region. The iteration may be performed until the AGV 105 is outside the next free road region. Further, a last pose of the set of intermediate poses in the next free road region may be assigned as the probable rest pose of the next free road region.

At step 304, he trajectory plan for the critical segment of the path may be generated by iteratively generating the trajectory sub-plans for a set of probable rest poses between the current rest pose and the final goal pose. As stated above, a probable rest pose for the next free road region is a last intermediate rest pose of the next free road region. The iteration may be performed until the AGV 105 reaches the final goal pose (i.e., the upcoming goal position).

Figure 4:
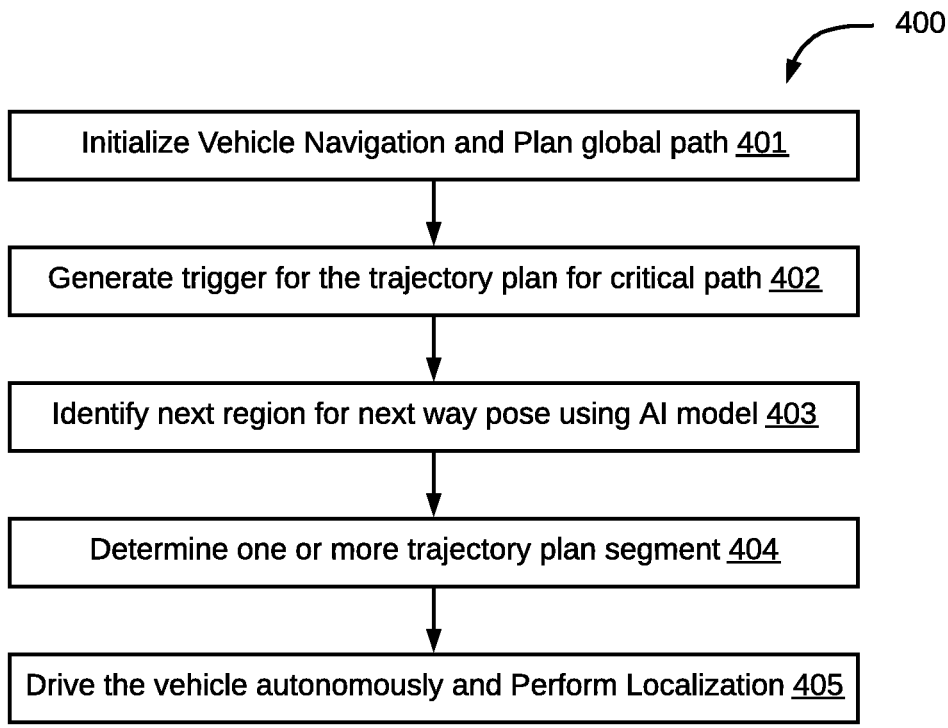
FIG. 4 is a flow diagram of a detailed exemplary process for generating a trajectory plan for an AGV, in accordance with some embodiments of the present disclosure.

Referring now to FIG. 4, an exemplary process 400 for generating a trajectory plan for an AGV 105 is depicted in greater detail via a flowchart, in accordance with some embodiments of the present disclosure. At step 401, the navigation may be initialized for the AGV 105 and the global path planning may be performed. As discussed above, the NIM 201 may initialize the navigation, while the PPM 202 may plan the global path. In an embodiment, for navigation initialization, the NIM 201 may render a navigation map over a UI to the user. In the navigation map, the user may be able to see the current initial location of the AGV 105 (also referred as the source location or the source point). In addition, provision may be given to the user to touch any point (on the drivable road area only) on the navigation map to choose the destination location (also referred as the destination point). Based on the current initial location of the AGV 105 and the destination location chosen by the user, the PPM 202 may initiate the process to produces the base path for the navigation of the AGV 105 from the source point to the destination point. In some embodiments, the base path may be produced using shortest path algorithm or any other path planning algorithm. Additionally, the base path may be produced on a 2D occupancy grid map and a source to destination path plan may be generated.

At step 402, a trigger may be generated for generating the trajectory plan for the critical segment of the path followed by the AGV 105. An assessment may be performed to establish a need for preparing the trajectory plan for the critical segment of the path. The trigger may be generated upon establishing the need. As stated above, the CTPTGM 203 may assess the upcoming goal position for the AGV 105 (along a path of the AGV 105) with respect to the current position of the AGV 105 to establish the need. The CTPTGM 203 may determine a trigger parameter (also referred to as trigger parameter amplitude) based on a distance 'D' between the upcoming goal position and the current position, an '|α|' angle between a final orientation of the AGV 105 at the upcoming goal position and a current orientation of the AGV 105, and an imaginary angle '|β|' between an orientation of the AGV 105 towards the upcoming goal position at the current position and the current orientation of the AGV 105. In particular, the CTPTGM 203 may determine the trigger parameter as per equation (1) given below:

$$\text{Trigger parameter amplitude } (A_t) = (1/D) * |\beta| + (1/D) * \cos|\alpha/2| \quad \text{Equation (1)}$$

It should be noted that, the value for '|α|' and '|β|' may lie between 0 to 3.14 radians. Moreover, in order to generate the trigger, the trigger parameter amplitude may be compared with a predefined threshold. If the trigger parameter amplitude is determined to be beyond the predefined threshold, a need is established to prepare the trajectory plan for the critical segment. However, if the trigger parameter amplitude is determined to be within the predefined threshold, a need is not established. In absence of the need, a standard trajectory plan may be prepared for normal navigation scenario. It should be noted that, the equation (1) may be derived based on data analysis of 'α' & 'β' at various challenging navigation scenario and observation of criticality handled by the AGV 105.

Once the need for preparing the trajectory plan for the critical segment is established, at step 403, a next region corresponding to a hint next rest pose may be identified for the AGV 105, using the AI model. The hint next rest pose may be determined by using the AI model and based on the current road region, the current rest pose, the final goal pose, the visible road region, and the vehicle capability. In an embodiment, the AGV 105 may have to shift orientation with 'α' radians by manoeuvring within the next free road region. Moreover, for determining the next free road region the vehicle may have to determine the hint next rest pose for that region. The hint next rest pose may include the hint next position of the AGV 105 and the hint next orientation of the AGV 105. It should be noted that a rest pose for the AGV 105 is a position at which need to take a major shift in its navigation. For example, the AGV 105 may change its steering angle (magnitude and/or direction) or may change its moving direction (i.e., in forward direction or backward direction). It should be noted that, the hint next rest pose may be determined be the AIbNRIM 204.

However, based on the vehicle capability, a number of hint next rest poses may be possible for any given free road regions. By way of an example, the number of hint next rest poses may be in a range of about 1000. Thus, the AI model is trained to determine the most suitable or optimum hint next rest pose. The training may involve driving through multiple critical segments and acquiring training data. The training data may be annotated taking consideration of certain number of next rest poses for the next free road region with respect to the current initial position of the AGV 105 and the current region of the AGV 105. Further, in the operational mode, a free road region may be defined around an output hint next rest pose, by region growing mechanism. It should be noted that, the region growing may happen such that, it inflates a boundary (e.g., a rectangular boundary) while maintaining a symmetric pattern such that the inflated boundary does not overlap the previous region.

Thereafter, at step 404, one or more trajectory sub-plans (i.e., trajectory plan for a segment between current rest pose and the hint next rest pose) may be determined. In other words, the trajectory sub-plan may correspond to a portion of the critical segment of the path for which the trajectory plan is to be generated. As will be appreciated, the AI model trained of the AGV 105 may have learned to determine the next free road region centering the hint next rest pose for a given current input pose. The given current input pose may also be referred as the current rest pose. In this step, based on the hint next rest poses, a trajectory sub-plan may be determined corresponding to the next free road region. Moreover, based on the hint next rest pose a set of intermediate poses forming a trajectory may be deterministically determined. It should be noted that, the trajectory plan may be generated by the CTSMGM 205. Additionally, based on a process of determining the trajectory sub-plans for successive next free road regions in an iterative manner, the AGV 105 may be able to identify a complete trajectory plan in a recursive manner. In an embodiment, the trajectory sub-plan may be generated based on a set of rules, between different road regions or within the same road region. The set of rules may be explained in greater details in conjunction to FIGS. 10A and 10B. At step 405, the AGV 105 may perform localization and may be autonomously driven based on the trajectory plan generated corresponding to the critical segment of the path or the normal segment of the path.

Figure 5:
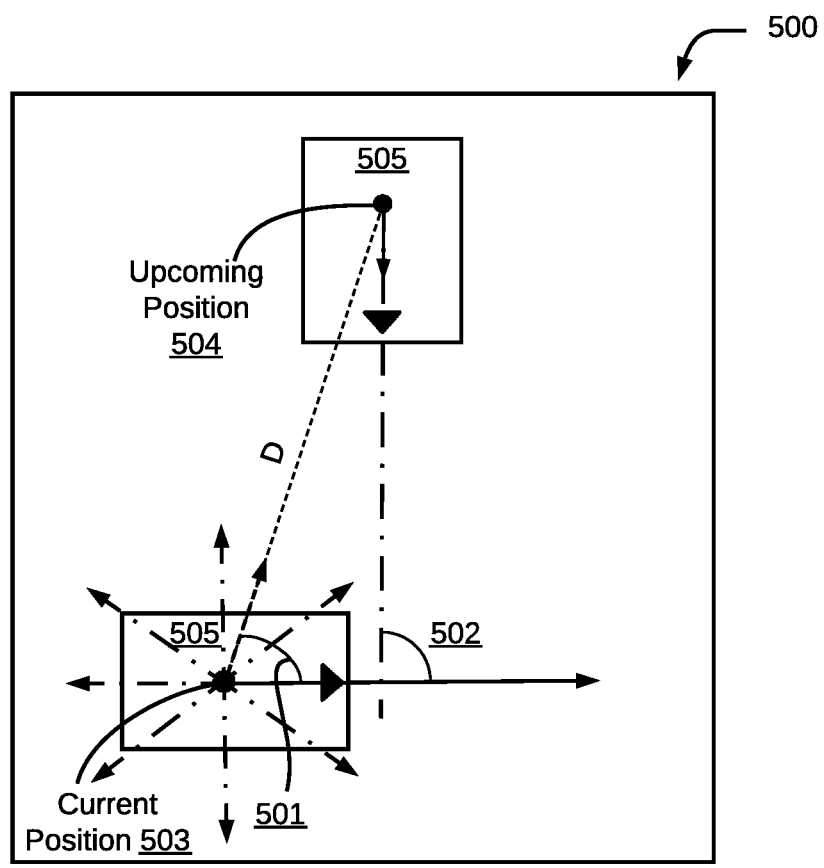
FIG. 5 illustrates a methodology for performing an assessment of an upcoming goal position for an AGV to establish a need for preparing a trajectory plan for a critical segment, in accordance with some embodiments of the present disclosure.

Referring now to FIG. 5, a methodology for performing an assessment 500 of an upcoming goal position 504 for an AGV 505 so as to establish a need for preparing a trajectory plan for a critical segment is illustrated, in accordance with some embodiments of the present disclosure. In particular, the assessment 500 is performed from a current position 503 of the AGV 505. The current position 503 and the upcoming goal position 504 may be separated by a distance 'D'. A change in vehicle orientation from a current orientation at the current position 503 to a final orientation at the upcoming goal position 504 is represented by an angle '|α|' 502. In other words, the angle '|α|' 502 is an angle between a final orientation of the AGV 505 at the upcoming goal position 504 and a current orientation of the AGV 505. Further, an orientation towards the upcoming goal position 504 with respect to the current orientation is represented by an angle '|β|' 501. In other words, the angle '|β|' 501 is an angle between an orientation of the AGV 505 towards the upcoming goal position 504 at the current position 503 and the current orientation of the AGV 505. A trigger parameter may be determined based on the distance 'D', the angle '|α|' 502, and the angle '|β|' 501 as per equation (1) discussed above. The trigger parameter may be then compared with a predefined threshold to perform assessment 500 and establish the need for preparing the trajectory plan for the critical segment of the path.

Figure 6:
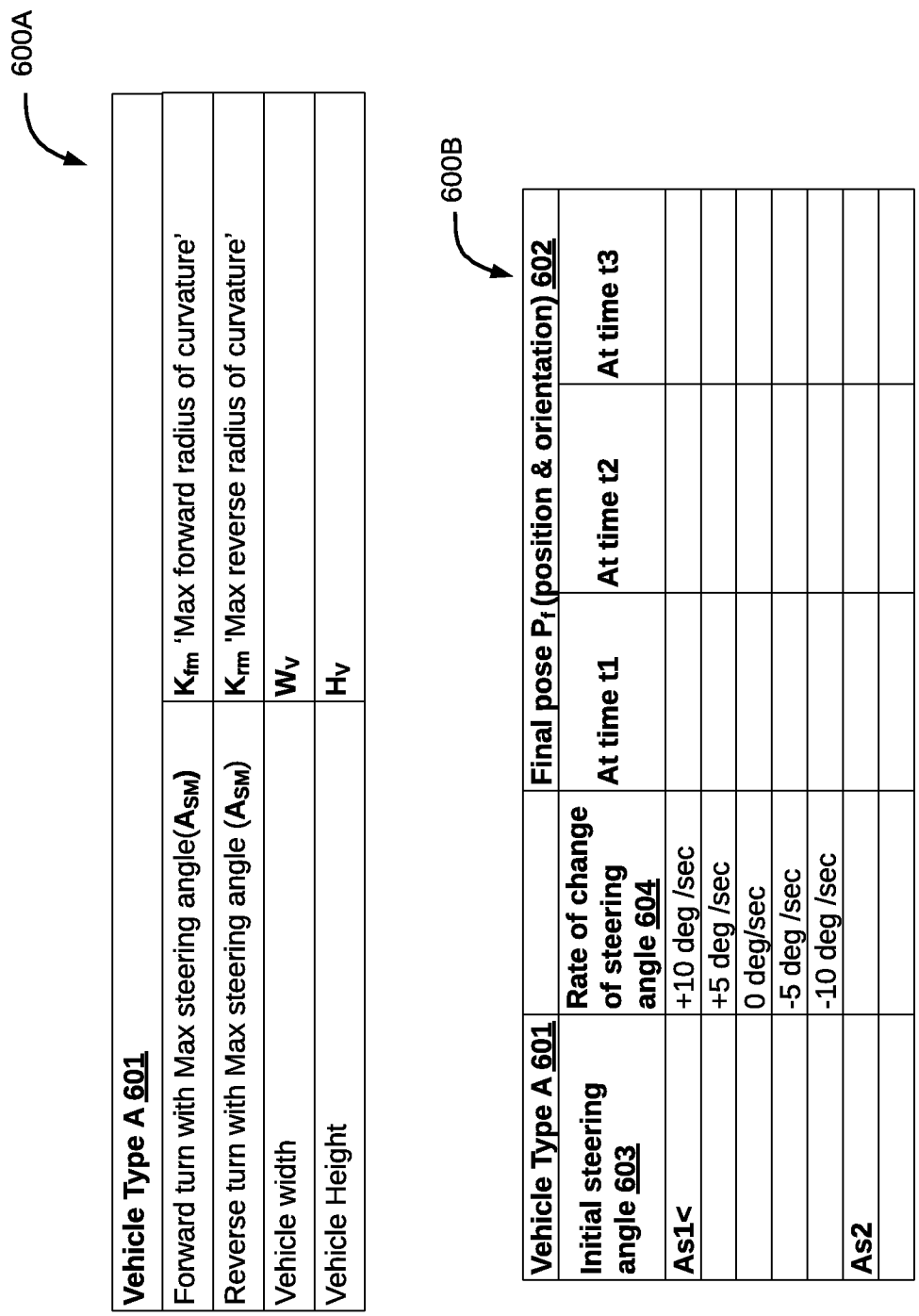
FIG. 6 depicts exemplary tables providing vehicle capability of the AGV, in accordance with some embodiments of the present disclosure.

Referring now to FIG. 6, exemplary tables 600A and 600B providing vehicle capability of the AGV 601 is depicted, in accordance with some embodiments of the present disclosure. The table 600A depicts generic vehicle capabilities for the AGV 601. By way of an example, the generic vehicle capabilities may include, but may be not limited to, a maximum steering angle, a forward turn with the maximum steering angle, a backward turn with the maximum steering angle, a vehicle height, a vehicle width, and so forth. Further, the table 600B depicts vehicle capabilities established by the AGV 601 while navigating critical trajectory paths. As will be appreciated, table 600B hold experimental data based on performance of the AGV 601 while navigating critical trajectory paths during experiments performed at factory and at workshop. In particular, the table 600B holds data with respect to a rate of change of steering angle 604 at a given load and for a given initial steering angle 603. The table 600B may also include a final pose $P_f$ (i.e., position and orientation) 602 for the AGV 601 monitored at time t1, time t2, and time t3. The vehicle capabilities provided in the tables 600A and 600B may be required to train the AI model for the AGV 601. Moreover, the vehicle capabilities provided in the table 600A may be required to determine the set of hint next rest poses during real-time navigation.

Figure 7A:
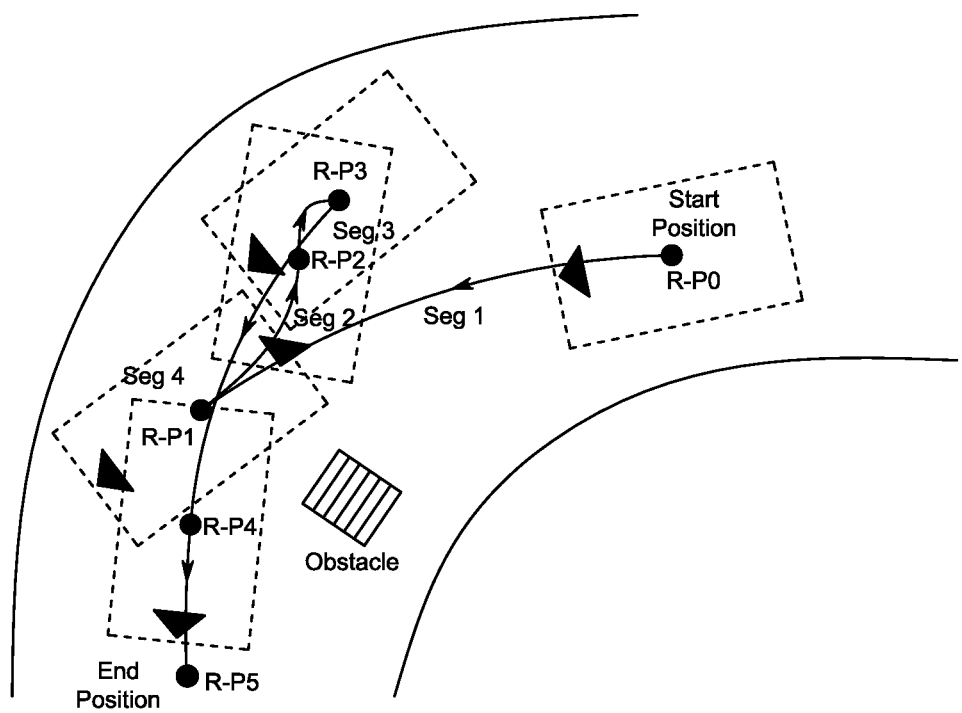
FIG. 7A-7E illustrate an exemplary navigation scenario involving generation of a trajectory plan for critical segment of a navigation path, in accordance with some embodiments of the present disclosure.
Figure 7B:
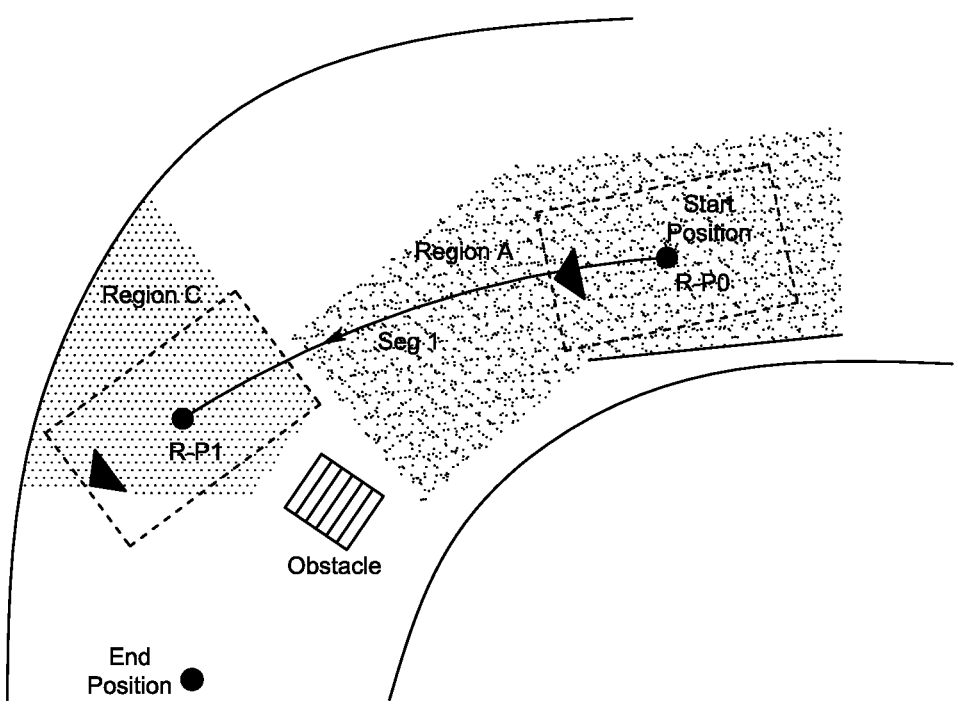

Referring now to FIG. 7A-7E, an exemplary navigation scenario involving generation of a trajectory plan for a critical segment of a navigation path is illustrated, in accordance with some embodiments of the present disclosure. In other word, FIG. 7A-7E represents the AGV's 105 trajectory plan for the critical segment of the path. FIG. 7A represents a complete trajectory plan for the critical segment of the path, depicting the exemplary navigation scenario. The complete trajectory plan as depicted in FIG. 7A represents a start position (i.e., rest pose R-P0) and an end position for the AGV 105 (i.e., rest pose R-PN). The hint next rest poses may be represented by 'R-Pn' (n being 1, 2, 3 . . . N–1) indicated as R-P1, R-P2, R-P3, R-P4. The hint next rest poses represented by 'R-Pn' may correspond to different next free road regions, where the AGV 105 may take little pause and initiate drastic change in motion. The critical segment of the path followed by the AGV 105 between two rest poses may be represented as 'SegN' indicated as Seg 1, Seg 2, Seg 3, and Seg 4. The critical segment of the path represented as 'SegN' may indicate facing direction (i.e., forward and backward) of the AGV 105.

Figure 7C:
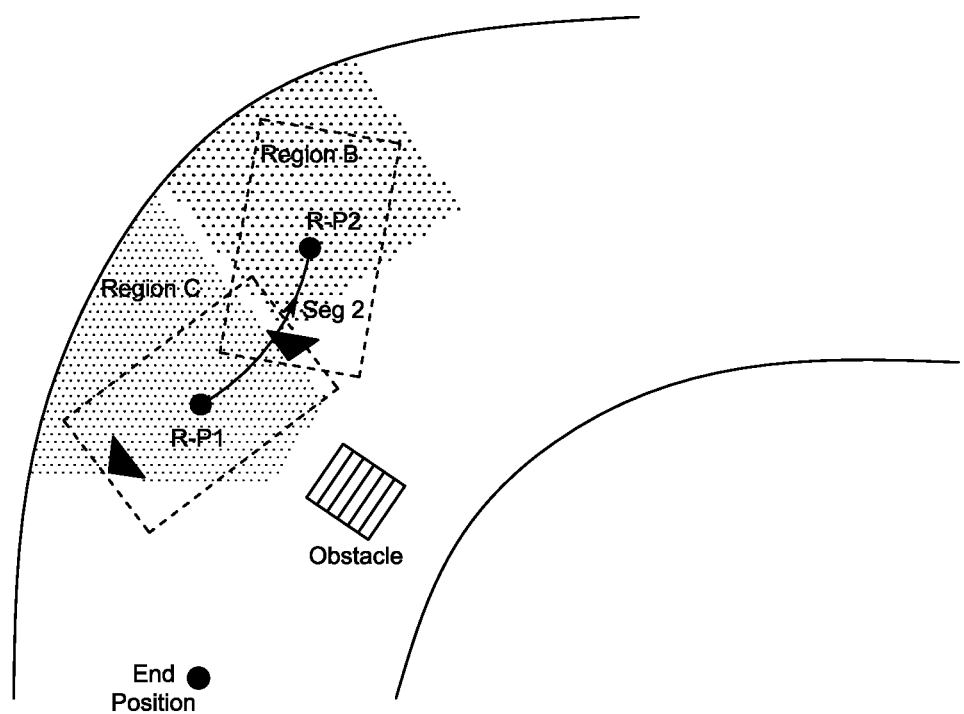
Figure 7D:
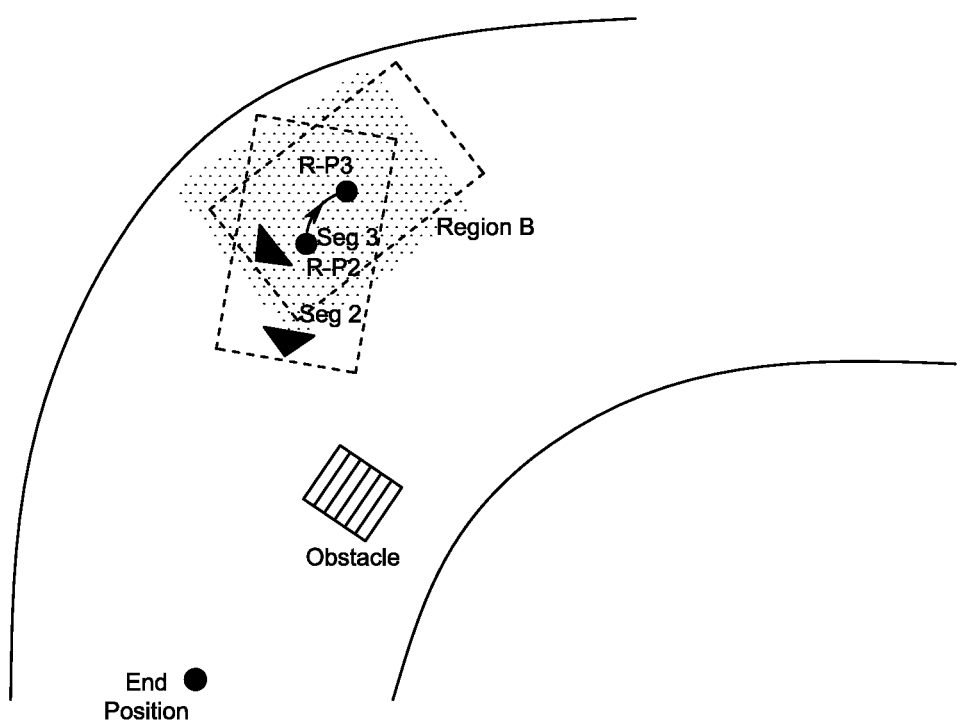
Figure 7E:
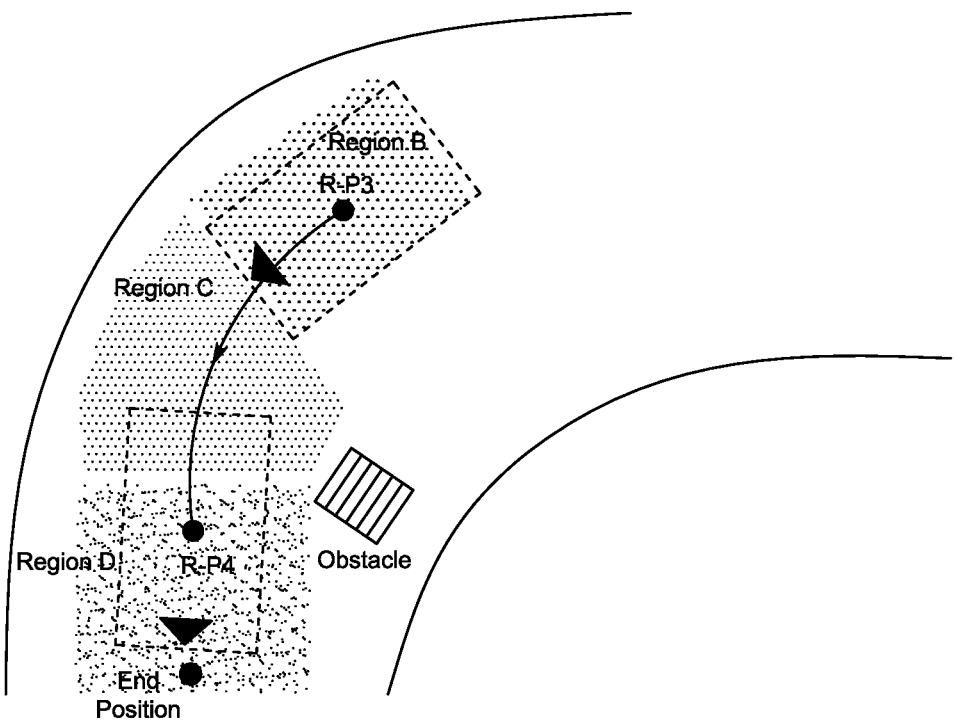

FIG. 7B-7E represents the critical segments of the path by segments. In other words, FIG. 7B-7E shows how these segments have been generated one after another. The FIG. 7B may represent the movement of the AGV 105 from the start position, i.e., R-P0 of region A to a hint next rest pose, i.e., R-P1 of region C via a first critical segment, i.e., Seg 1. Moreover, the movement followed by the AGV 105 from R-P0 to R-P1 is in forward direction. Similarly, the FIG. 7C represents the movement of the AGV 105 from R-P1 of region C to a hint next rest pose, i.e., R-P2 of region B via a second critical segment, i.e., Seg 2. Moreover, the movement followed by the AGV 105 from R-P1 to R-P2 is in backward direction. Further, in the FIG. 7D the movement of the AGV 105 is represented from R-P2 of region B to a hint next rest pose, i.e., R-P3 of region B itself, via a third critical segment, i.e., Seg 3. Moreover, the movement followed by the AGV 105 from R-P2 to R-P3 is again in backward direction. Thereafter, the FIG. 7E may represent the movement of the AGV 105 from R-P3 of region B to a hint next rest pose, i.e., R-P4 of region D via a fourth critical segment, i.e., Seg 4. Moreover, the movement followed by the AGV 105 from R-P3 to R-P4 is in forward direction. In addition, the AGV 105 may reach the end position of the trajectory planned for the critical segment of the path.

Figure 8:
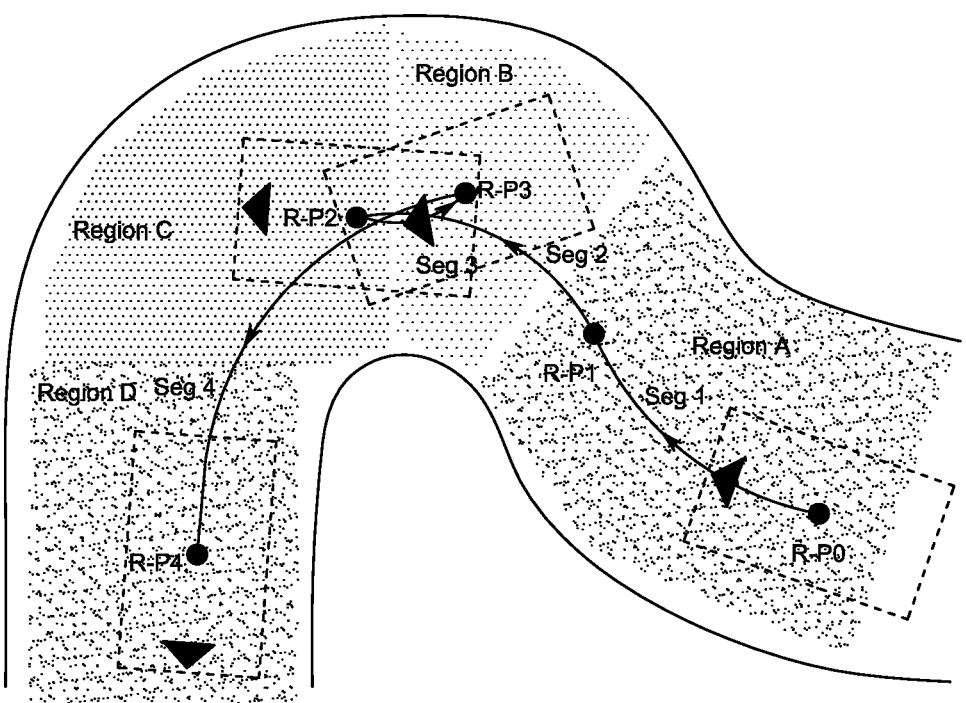
FIG. 8 illustrates another exemplary navigation scenario involving generation of a trajectory plan for critical segment of a navigation path, in accordance with some embodiments of the present disclosure.

Referring now to FIG. 8, another exemplary navigation scenario involving generation of a trajectory plan for a critical segment of a navigation path is illustrated, in accordance with some embodiments of the present disclosure. In particular, a complete trajectory plan for the critical segment of the path is illustrated for the exemplary navigation scenario. The complete trajectory plan may be divided into multiple regions from a start point to a destination point. The multiple road regions may include region A, region B, region C, and region D. In an embodiment, the multiple road regions may correspond to the set of next free road regions. The complete trajectory plan represents a start position (i.e., R-P0) and an end position for the AGV 105 (i.e., R-P4). The set of hint next rest poses may be represented by 'R-Pn' indicated as R-P1, R-P2, and R-P3. The critical segment of the path followed by the AGV 105 may be represented as 'SegN' indicated as Seg 1, Seg 2, Seg 3, and Seg 4. The critical segment of the path represented as 'SegN' may indicate facing direction (i.e., forward and backward) of the AGV 105.

By way of an example, during experimental data acquisition, a driver may maneuver the AGV 105 through these regions by applying different steering angle variation. In addition, the AGV 105 may pass through multiple rest position in multiple regions, before reaching the destination position. Each of the rest position may be either in different region or sometime two consecutive rest position may belong to same region. It should be noted that, based on such kind of driving on various road scenario for a typical AGV 105, the AGV 105 may learn to identify the next region and the next rest position.

Figure 9:
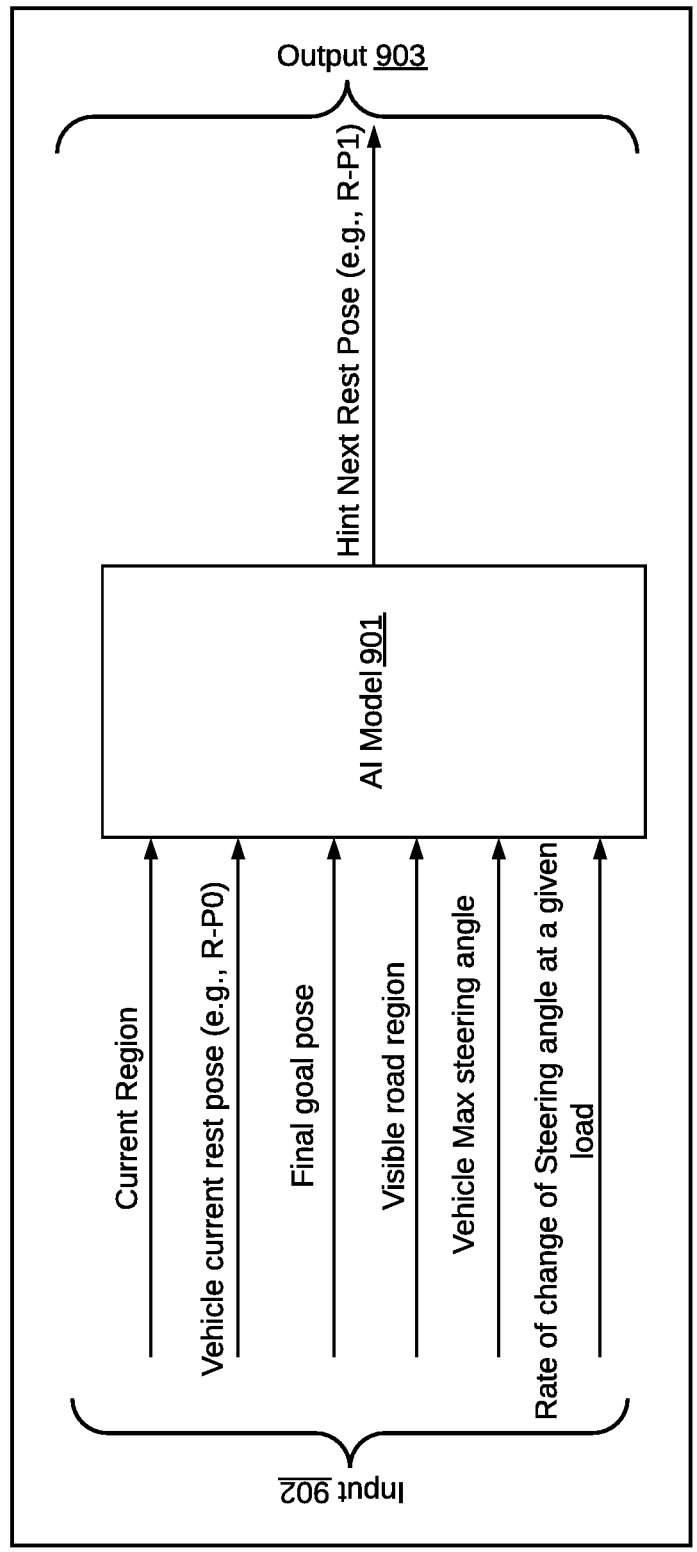
FIG. 9 is a block diagram of a trained AI model for determining a hint next rest poses, in accordance with some embodiments of the present disclosure.

Referring now to FIG. 9, a block diagram of a trained AI model 901 for determining a hint next rest pose for the AGV 105 is illustrated, in accordance with some embodiments of the present disclosure. The AI model 901 may be trained based on a set of annotated inputs (current region, current rest pose, final goal pose, visible road region, maximum steering angle, rate of change of steering angle at a given load, etc.) and a set of annotated outputs (e.g., hint next rest poses for a next free road region). Once trained, during an operational phase, the AI model 901 may predict a most probable hint next rest pose for the AGV 105 (e.g., R-P1) as an output 903 based on the set of inputs 902. The inputs may include, but is not limited to, a current region, a current rest pose of the AGV 105 (e.g., R-P0), final goal pose, visible road region, vehicle maximum steering angle, and rate of change of steering angle.

Figure 10A:
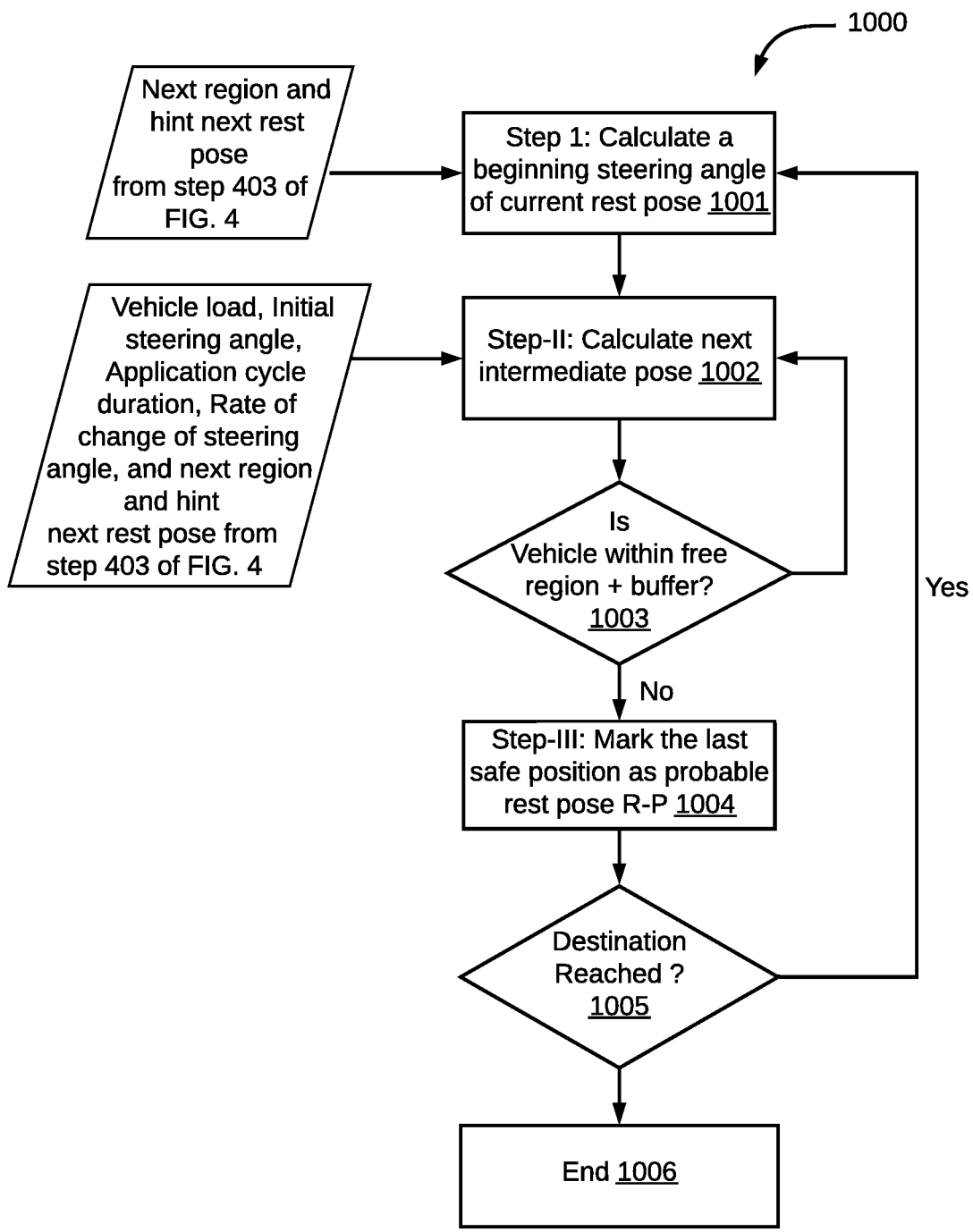
FIG. 10A is a flow diagram of an exemplary process for generating trajectory plan for a critical trajectory path, in accordance with some embodiments of the present disclosure.
Figure 10B:
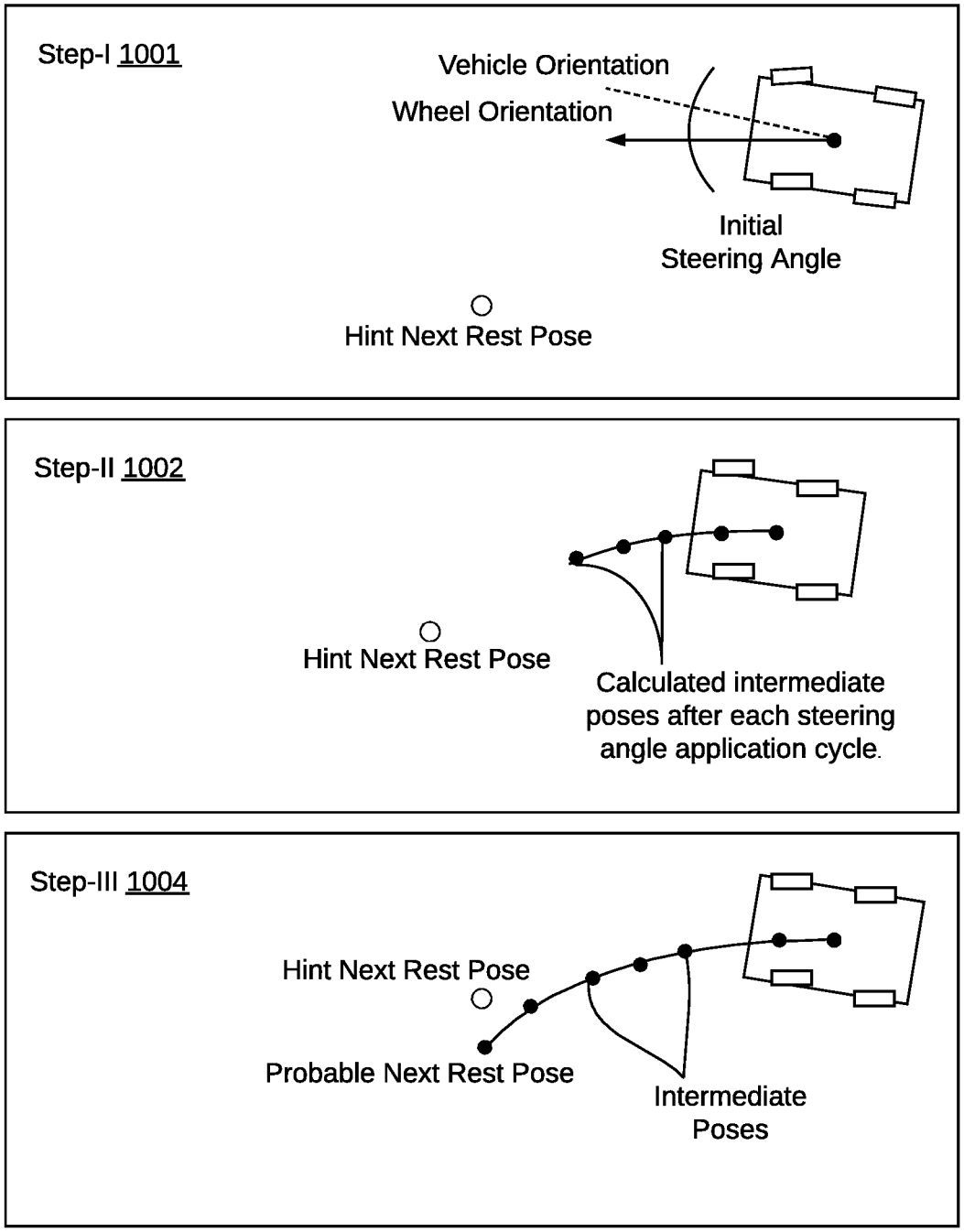
FIG. 10B is a pictorial representation for generation of the trajectory plan for the critical trajectory path as per the exemplary process of FIG. 10A, in accordance with some embodiments of the present disclosure.

Referring now to FIG. 10A, an exemplary process 1000 for generating a trajectory plan for a critical segment is depicted via flowchart, in accordance with some embodiments of the present disclosure. As discussed above, the trajectory plan for the critical segment may be generated by iteratively determining trajectory sub-plans corresponding to next free road regions. The AGV 105 may follow the generated trajectory sub-plans in order to navigate the corresponding next free road regions so as to reach the end position. As illustrated, the process 1000 may include a set of rules corresponding to step-I 1001, step-II 1002, and step-III 1004. At step-I 1001 a beginning steering angle of rest position may be determined based on the next region and next hint rest pose (provided by the AI model 901 at step 403 of FIG. 4). Moreover, if at least one iteration of step-II 1002 and step-III 1004 has occurred, the steering angle re-alignment calculation may be done by keeping the AGV 105 stationary for aiming a journey for a next rest pose.

On receiving the beginning steering angle, at step-II 1002, an intermediate pose may be calculated for the AGV 105. It should be noted that, for the complete trajectory sub-plan corresponding to a trajectory segment (i.e., a portion of the critical segment), an array of intermediate poses (i.e., a set of intermediate poses) may be determined between the current pose and a hint next rest pose. The array of intermediate poses may be iteratively determined based on next region and hint next rest pose (provided by the AI model 901 at step 403 of FIG. 4), an initial steering angle, a vehicle load, an application cycle duration, and a rate of change of steering angle (proportional to 'hint pose orientation and to initial pose orientation'). The application cycle duration may correspond to a typical duration of one steering angle cycle, for example—500 ms. The iteration is performed as long as intermediate pose is within the next free region for which the intermediate poses are being calculated. Thus, at 1003, a check is performed to determine, whether the AGV 105 is within the free region and a buffer (i.e., a pre-defined zone just at the boundary of the next free region). In other words, on determining the array of intermediate poses between the current rest pose and the hint next rest pose, two checks may be performed. The first check may include determining whether the vehicle while reaching the next rest pose may be within the free road region or not. The second additional check may include determining whether the vehicle orientation may be aligned within a threshold level of hint rest pose orientation or not. For the second check, a measure is taken to ensure that from the first R-P to the next R-P, the rest pose orientation may have to increase alignment towards the goal orientation.

Further, at step-III 1004, a last safe position (i.e., last intermediate pose) may be marked as the probable rest pose of the trajectory plan. Moreover, there may be multiple hint next rest poses in the trajectory plan consisting of multiple segments. Thus, at 1005, for each hint next rest pose, a check may be performed to determine whether the hint next rest pose is within a threshold range of the destination point. In other words, a check may be performed to determine whether the vehicle has reached the destination point (i.e., the end pose). In some embodiments, additional check may be performed by checking for the orientation match at each of the derived hint next rest poses with the orientation at end pose. Moreover, at 1006, when both the distance and the orientation for a hint next rest pose matches with that for the end pose, the trajectory planning for the critical segment may be concluded and the complete trajectory plan may be declared. Otherwise, the process 1000 may iterate, by moving back to step-I 1001 for further generation of the trajectory sub-plan. In this manner, a complete trajectory plan for the critical segment may be generated Referring now to FIG. 10B, generation of the trajectory plan for the critical trajectory path as per the exemplary process of FIG. 10A is pictorially represented, in accordance with some embodiments of the present disclosure. At step-I 1001 the AGV 105 is depicted with vehicle orientation (i.e., the orientation of the AGV 105), the wheel orientation, the beginning steering angle, and the next hint pose. Further, at step-II 1002, the AGV 105 is depicted along with the intermediate poses calculated after each steering angle application cycle. In addition, the next hint pose is also depicted. Thereafter, at step-III 1003, the AGV 105 along with the probable next rest pose (deterministic rest pose corresponding to the hint next rest pose) is depicted. In addition, the next hint rest pose and next rest poses are also depicted.

Figure 11:
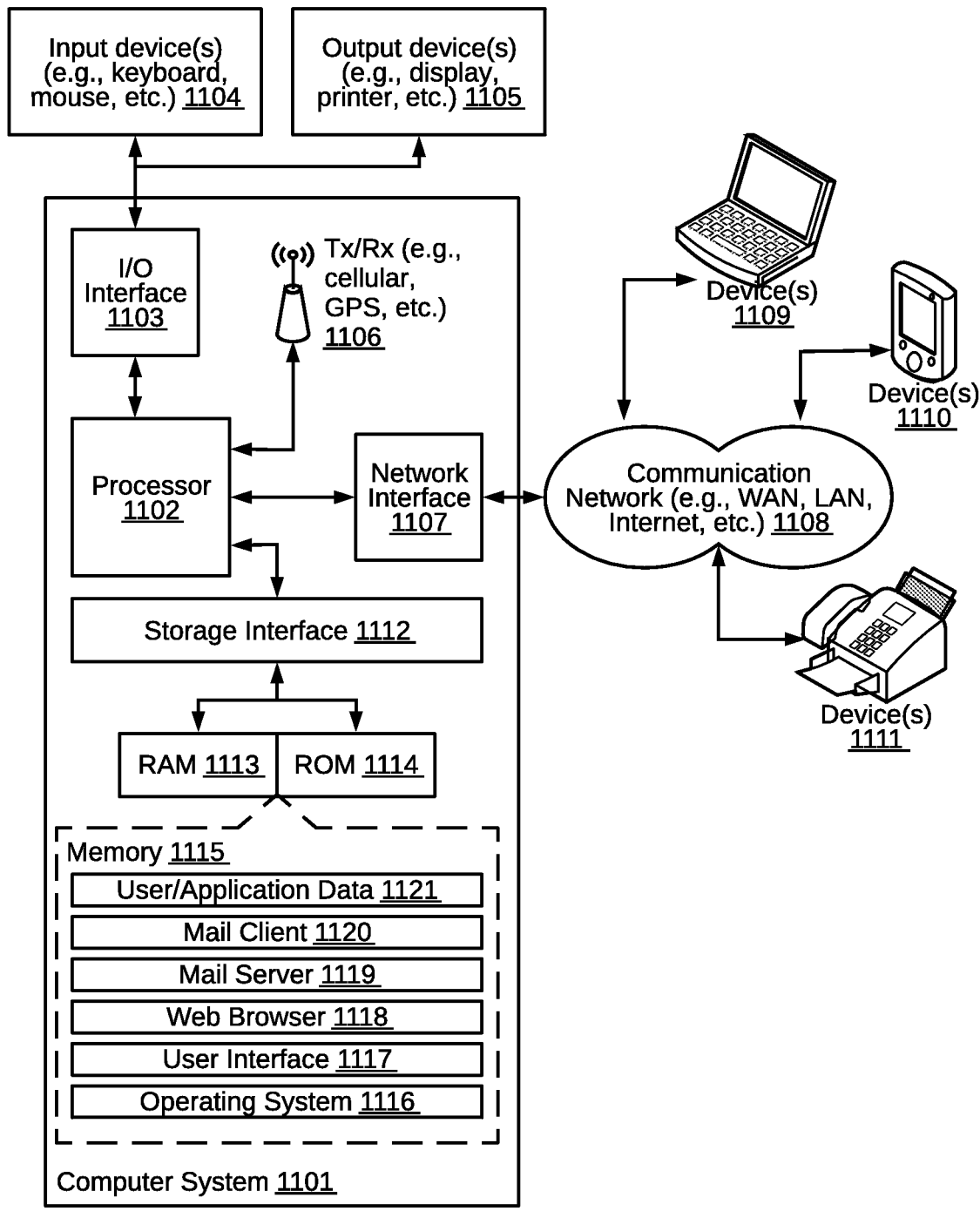
FIG. 11 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 11, a block diagram of an exemplary computer system 1101 for implementing various embodiments is illustrated. Computer system 1101 may include a central processing unit ("CPU" or "processor") 1102. Processor 1102 may include at least one data processor for executing program components for executing user-generated or system-generated requests. A user may include a person, a person using a device such as those included in this disclosure, or such a device itself. The processor 1102 may include specialized processing units such as integrated system (bus) controllers, memory management control units, floating point units, graphics processing units, digital signal processing units, etc. The processor 1102 may include a microprocessor, such as AMD® ATHLOM® microprocessor, DURON® microprocessor or OPTERON® microprocessor ARM's application, embedded or secure processors, IBM® POWERPC®, INTEL'S CORE® processor, ITANIUM® processor, XEON® processor, CELERON® processor or other line of processors, etc. The processor 1102 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 1102 may be disposed in communication with one or more input/output (I/O) devices via an I/O interface 1103. The I/O interface 1103 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using the I/O interface 1103, computer system 1101 may communicate with one or more I/O devices. For example, an input device 1104 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1105 may be a printer, fax machine, video display (for example, cathode ray tube (CRT), liquid crystal display (LCD), light-emitting diode (LED), plasma, or the like), audio speaker, etc. In some embodiments, a transceiver 1106 may be disposed in connection with processor 1102. Transceiver 1106 may facilitate various types of wireless transmission or reception. For example, transceiver 1106 may include an antenna operatively connected to a transceiver chip (for example, TEXAS® INSTRUMENTS WILINK WL1283® transceiver, BROADCOM® BCM4750IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1102 may be disposed in communication with a communication network 1108 via a network interface 1107. The network interface 1107 may communicate with communication network 1108. The network interface 1107 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. The communication network 1108 may include, without limitation, a direct interconnection, local area network (LAN), wide area network (WAN), wireless network (for example, using Wireless Application Protocol), the Internet, etc. Using the network interface 1107 and the communication network 1108, the computer system 1101 may communicate with devices 1109, 1110, and 1111. These devices 1109, 1110, and 1111 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, the computer system 1101 may itself embody one or more of these devices 1109, 1110, and 1111.

In some embodiments, the processor 1102 may be disposed in communication with one or more memory devices 1115 (for example, RAM 1113, ROM 1114, etc.) via a storage interface 1112. The storage interface 1112 may connect to memory 1115 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory device 1115 may store a collection of program or database components, including, without limitation, an operating system 1116, user interface application 1117, web browser 1118, mail server 1119, mail client 1120, user/application data 1121 (for example, any data variables or data records discussed in this disclosure), etc. The operating system 1116 may facilitate resource management and operation of the computer system 1101. Examples of operating systems 1116 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1117 may facilitate display, execution, interaction, manipulation, or operation of program components through textual or graphical facilities. For example, user interfaces 1117 may provide computer interaction interface elements on a display system operatively connected to the computer system 1101, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, the computer system 1101 may implement a web browser 1118 stored program component. The web browser 1118 may be a hypertext viewing application, such as MICROSOFT® INTERNET EXPLORER® web browser, GOOGLE® CHROME® web browser, MOZILLA® FIREFOX® web browser, APPLE®

SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1101 may implement a mail server 1119 stored program component. Mail server 1119 may be an Internet mail server such as MICROSOFT® EXCHANGE® mail server, or the like. Mail server 1119 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1119 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1101 may implement a mail client 1120 stored program component. Mail client 1120 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, the computer system 1101 may store user/application data 1121, such as the data, variables, records, etc. as described in this disclosure. Such databases may be implemented as fault-tolerant, relational, scalable, secure databases such as ORACLE® database or SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in the various embodiments discussed above are not routine, or conventional, or well understood in the art. The techniques discussed above provide for generating a trajectory plan for an autonomous ground vehicle (AGV). In particular, the techniques provide for assessment of an upcoming goal position for an AGV with respect to a current position of the AGV along a path of the AGV to establish a need for preparing a trajectory plan for a critical segment of the path. Upon establishing the need, the techniques also provide for determination of a next free road region based on a hint next rest pose along the critical segment of the path. Thereafter, the techniques provide for generation of a trajectory sub-plan corresponding to the next free road region by iteratively determining a set of intermediate poses between the current rest pose and the hint next rest pose based on the hint next rest pose for the next free road region and a set of parameters of the AGV. Lastly, the techniques provide for generation of the trajectory plan for the critical segment of the path by iteratively generating the trajectory sub-plans for a set of probable rest poses between the current rest pose and the final goal pose. As stated above, a probable rest pose for the next free road region is a last intermediate rest pose of the next free road region, and the iteration is performed until the AGV reaches the final goal pose.

Thus, the techniques provide for a number of benefits including, but not limited to, preparation of trajectory plan for any critical navigation scenario and generation of multi-segment trajectory plan considering heavy automatic maneuver. Thus, the techniques enable the AGV to handle any kind challenging navigation scenario while providing sufficient time for maneuver.

The specification has described method and system generating a trajectory plan for an autonomous ground vehicle (AGV). The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for generating a trajectory plan for an autonomous ground vehicle (AGV), the method comprising:

assessing, by a navigation device, an upcoming goal position for an AGV with respect to a current position of the AGV along a path of the AGV to establish a need for preparing a trajectory plan for a critical segment of the path;

determining, by the navigation device and upon establishing the need, a next free road region based on a hint next rest pose along the critical segment of the path, wherein the hint next rest pose is determined by an artificial intelligence (AI) model and based on a current road region, a current rest pose, a final goal pose, a visible road region, and a vehicle capability;

generating, by the navigation device, a trajectory sub-plan corresponding to the next free road region by iteratively determining a set of intermediate poses between the current rest pose and the hint next rest pose based on the hint next rest pose for the next free road region and a set of parameters of the AGV; and generating, by the navigation device, the trajectory plan for the critical segment of the path by iteratively generating the trajectory sub-plans for a set of probable rest poses between the current rest pose and the final goal pose, wherein a probable rest pose for the next free road region is a last intermediate rest pose of the next free road region, and wherein iteration is performed until the AGV reaches the final goal pose.

2. The method of claim 1, wherein assessing the upcoming goal position for the AGV comprises:

determining a trigger parameter based on a distance between the upcoming goal position and the current position, an angle between a final orientation of the AGV at the upcoming goal position and a current orientation of the AGV, and an angle between an imaginary orientation of the AGV towards the upcoming goal position at the current position and the current orientation of the AGV; and comparing the trigger parameter with a predefined threshold to establish the need.

3. The method of claim 2, further comprising preparing a standard trajectory plan in an absence of the need.

4. The method of claim 1, wherein the hint next rest pose comprises a hint next position of the AGV and a hint next orientation of the AGV, and wherein the next free road regions is defined around the hint next rest poses by employing region growing mechanism.

5. The method of claim 1, further comprising training the AI model to determine the hint next rest pose using training data acquired by the AGV while driving through a plurality of critical segments, wherein the training data comprises the current road region, the current rest pose, the final goal pose, the visible road region, the vehicle capability, as input of the AI model and a set of hint next rest poses in a successive road region as output of the AI model.

6. The method of claim 1, wherein the vehicle capability comprises at least one of a maximum steering angle, a forward turn with the maximum steering angle, a backward turn with the maximum steering angle, a vehicle height, a vehicle width, and a rate of change of steering angle at a given load.

7. The method of claim 1, wherein generating the trajectory sub-plan corresponding to the next free road region comprises:

computing an initial steering angle for the current rest pose based on the hint next rest pose for the next free road region;

iteratively computing the set of intermediate poses in the next free road region based on the initial steering angle, a rate of change of the steering angle, and the hint next rest pose for the next free road region, wherein iteration is performed until the AGV is outside the next free road region; and assigning the last pose of the set of intermediate poses in the next free road region as the probable rest pose of the next free road region.

8. A system for generating a trajectory plan for an autonomous ground vehicle (AGV), the system comprising:

a navigation device comprising a processor and a memory communicatively coupled to the processor, wherein the memory stores processor-executable instructions, which, on execution, causes the processor to:

assess an upcoming goal position for an AGV with respect to a current position of the AGV along a path of the AGV to establish a need for preparing a trajectory plan for a critical segment of the path;

determine, upon establishing the need, a next free road region based on a hint next rest pose along the critical segment of the path, wherein the hint next rest pose is determined by an artificial intelligence (AI) model and based on a current road region, a current rest pose, a final goal pose, a visible road region, and a vehicle capability;

generate a trajectory sub-plan corresponding to the next free road region by iteratively determining a set of intermediate poses between the current rest pose and the hint next rest pose based on the hint next rest pose for the next free road region and a set of parameters of the AGV; and generate the trajectory plan for the critical segment of the path by iteratively generating the trajectory sub-plans for a set of probable rest poses between the current rest pose and the final goal pose, wherein a probable rest pose for the next free road region is a last intermediate rest pose of the next free road region, and wherein iteration is performed until the AGV reaches the final goal pose.

9. The system of claim 8, wherein the processor-executable instructions, on execution, causes the processor to assess the upcoming goal position for the AGV by:

determining a trigger parameter based on a distance between the upcoming goal position and the current position, an angle between a final orientation of the AGV at the upcoming goal position and a current orientation of the AGV, and an angle between an imaginary orientation of the AGV towards the upcoming goal position at the current position and the current orientation of the AGV; and comparing the trigger parameter with a predefined threshold to establish the need.

10. The system of claim 9, wherein the processor-executable instructions, on execution, further causes the processor to prepare a standard trajectory plan in an absence of the need.

11. The system of claim 8, wherein the hint next rest pose comprises a hint next position of the AGV and a hint next orientation of the AGV, and wherein the next free road regions is defined around the hint next rest poses by employing region growing mechanism.

12. The system of claim 8, wherein the processor-executable instructions, on execution, further causes the processor to train the AI model to determine the hint next rest pose using training data acquired by the AGV while driving through a plurality of critical segments, wherein the training data comprises the current road region, the current rest pose, the final goal pose, the visible road region, the vehicle capability, as input of the AI model and a set of hint next rest poses in a successive road region as output of the AI model.

13. The system of claim 8, wherein the vehicle capability comprises at least one of a maximum steering angle, a forward turn with the maximum steering angle, a backward turn with the maximum steering angle, a vehicle height, a vehicle width, and a rate of change of steering angle at a given load.

14. The system of claim 8, wherein the processor-executable instructions, on execution, causes the processor to generate the trajectory sub-plan corresponding to the next free road region by:
  computing an initial steering angle for the current rest pose based on the hint next rest pose for the next free road region;
  iteratively computing the set of intermediate poses in the next free road region based on the initial steering angle, a rate of change of the steering angle, and the hint next rest pose for the next free road region, wherein iteration is performed until the AGV is outside the next free road region; and
  assigning the last pose of the set of intermediate poses in the next free road region as the probable rest pose of the next free road region.

15. A non-transitory computer-readable storage medium storing computer-executable instructions for:
  assessing an upcoming goal position for an AGV with respect to a current position of the AGV along a path of the AGV to establish a need for preparing a trajectory plan for a critical segment of the path;
  determining, upon establishing the need, a next free road region based on a hint next rest pose along the critical segment of the path, wherein the hint next rest pose is determined by an artificial intelligence (AI) model and based on a current road region, a current rest pose, a final goal pose, a visible road region, and a vehicle capability;
  generating a trajectory sub-plan corresponding to the next free road region by iteratively determining a set of intermediate poses between the current rest pose and the hint next rest pose based on the hint next rest pose for the next free road region and a set of parameters of the AGV; and
  generating the trajectory plan for the critical segment of the path by iteratively generating the trajectory sub-plans for a set of probable rest poses between the current rest pose and the final goal pose, wherein a probable rest pose for the next free road region is a last intermediate rest pose of the next free road region, and wherein iteration is performed until the AGV reaches the final goal pose.

16. The non-transitory computer-readable storage medium of claim 15, wherein assessing the upcoming goal position for the AGV comprises:
  determining a trigger parameter based on a distance between the upcoming goal position and the current position, an angle between a final orientation of the AGV at the upcoming goal position and a current orientation of the AGV, and an angle between an imaginary orientation of the AGV towards the upcoming goal position at the current position and the current orientation of the AGV; and
  comparing the trigger parameter with a predefined threshold to establish the need.

17. The non-transitory computer-readable storage medium of claim 16, further storing computer-executable instructions for preparing a standard trajectory plan in an absence of the need.

18. The non-transitory computer-readable storage medium of claim 15, wherein the hint next rest pose comprises a hint next position of the AGV and a hint next orientation of the AGV, and wherein the next free road regions is defined around the hint next rest poses by employing region growing mechanism.

19. The non-transitory computer-readable storage medium of claim 15, further storing computer-executable instructions for training the AI model to determine the hint next rest pose using training data acquired by the AGV while driving through a plurality of critical segments, wherein the training data comprises the current road region, the current rest pose, the final goal pose, the visible road region, the vehicle capability, as input of the AI model and a set of hint next rest poses in a successive road region as output of the AI model.

20. The non-transitory computer-readable storage medium of claim 16, wherein generating the trajectory sub-plan corresponding to the next free road region comprises:
  computing an initial steering angle for the current rest pose based on the hint next rest pose for the next free road region;
  iteratively computing the set of intermediate poses in the next free road region based on the initial steering angle, a rate of change of the steering angle, and the hint next rest pose for the next free road region, wherein iteration is performed until the AGV is outside the next free road region; and
  assigning the last pose of the set of intermediate poses in the next free road region as the probable rest pose of the next free road region.

* * * * *